United States Patent [19]
Axtell et al.

[11] Patent Number: 6,036,296
[45] Date of Patent: Mar. 14, 2000

[54] FLUID LEVEL DETECTION APPARATUS AND METHOD FOR DETERMINING THE VOLUME OF FLUID IN A CONTAINER

[75] Inventors: James P. Axtell, Portland, Oreg.; Preston D. Seu, Vancouver, Wash.

[73] Assignee: Hewlett-Packard Company, Fort Collins, Colo.

[21] Appl. No.: 08/741,893

[22] Filed: Oct. 31, 1996

[51] Int. Cl.[7] .................................................. B41J 2/195
[52] U.S. Cl. .................................................. 347/7; 347/86
[58] Field of Search ............................... 347/6, 7, 74, 75, 347/85–87; 116/109, 227, 290 B

[56] References Cited

U.S. PATENT DOCUMENTS

| | | | |
|---|---|---|---|
| 3,895,519 | 7/1975 | Bouchy et al. | 73/149 |
| 4,558,326 | 12/1985 | Kimura et al. | 347/30 |
| 4,639,738 | 1/1987 | Young et al. | 347/89 |
| 4,811,035 | 3/1989 | Huliba et al. | 347/89 |
| 4,872,489 | 10/1989 | Erhart | 141/5 |
| 4,910,529 | 3/1990 | Regnault | 347/6 |
| 4,935,751 | 6/1990 | Hamlin | 347/86 |
| 4,967,207 | 10/1990 | Ruder | 347/7 |
| 4,973,993 | 11/1990 | Allen | 347/7 |
| 4,998,115 | 3/1991 | Nevarez et al. | 347/35 |
| 4,998,116 | 3/1991 | Regnault | 347/6 |
| 5,072,570 | 1/1992 | Mohr et al. | 347/7 |
| 5,146,783 | 9/1992 | Jansche et al. | 73/301 |
| 5,396,316 | 3/1995 | Smith | 399/120 |
| 5,461,466 | 10/1995 | Girard et al. | 399/237 |
| 5,519,474 | 5/1996 | Arcaro et al. | 399/238 |
| 5,526,683 | 6/1996 | Maggio | 73/149 |
| 5,583,545 | 12/1996 | Pawlowski, Jr. et al. | 347/7 |

FOREIGN PATENT DOCUMENTS

| | | |
|---|---|---|
| 3929506A | 3/1991 | Germany . |
| 58-81147 | 3/1985 | Japan . |
| WO9013795A | 11/1990 | WIPO . |

OTHER PUBLICATIONS

European Search Report dated Oct. 30, 1998 for related Eurpoean Application 97308190.4.

*Primary Examiner*—John Barlow
*Assistant Examiner*—Craig A. Hallacher
*Attorney, Agent, or Firm*—Erik A. Anderson

[57] ABSTRACT

A fluid level detection system for determining the volume of fluid in a container, is disclosed. An embodiment includes a fluid container, a reference chamber, a pressure chamber, an air source, an air management system including at least one orifice, a pressure sensor, a time measurement device, and a computing device. The air management system selectively pressurizes the reference chamber or pressure chamber and selectively discharges the reference chamber or pressure chamber via the orifice. The time measurement device determines elapsed time ($\Delta t_R$) for pressure in the reference chamber to drop from pressure ($P_{R1}$) to pressure ($P_{R2}$) and elapsed time ($\Delta t_P$) for pressure in the pressure chamber to drop from pressure ($P_{P1}$) to pressure ($P_{P2}$). The computing device determines a volume of air in the pressure chamber based upon the reference chamber volume, elapsed time ($\Delta t_R$), elapsed time ($\Delta t_P$), and pressures ($P_{R1}$), ($P_{R2}$), ($P_{P1}$), and ($P_{P2}$), and determines the volume of fluid in the container based upon the pressure chamber volume and the volume of air in the pressure chamber. A printing device incorporating an embodiment of the fluid level detection system is also disclosed, as is a method for determining the volume of fluid in a container based upon the volume of air in a pressure chamber. An apparatus for use in a printing device is disclosed that includes a printing composition container, a printing composition port coupled to the container, a pressure chamber around the container, and an air port coupled to the pressure chamber.

23 Claims, 8 Drawing Sheets

6,036,296

FLUID LEVEL DETECTION APPARATUS AND METHOD FOR DETERMINING THE VOLUME OF FLUID IN A CONTAINER

BACKGROUND AND SUMMARY

The present invention relates to a fluid level detection system and method. More particularly, the present invention relates to a fluid level detection system and method for use in a printing device that determines the volume of fluid in a replaceable or refillable printing fluid container, such as that used in inkjet printing, based upon the volume of air in a pressure chamber having a volume which surrounds the container.

As with may items which are consumed during use, such as gasoline in a car, it is desirable for a user of a printing device to know how much printing fluid or printing composition (e.g., ink or toner) remains in a replaceable or refillable container. Printing devices which only provide an end-of-life or out-of-printing fluid indication do not give the user sufficient warning before printing stops. Also, if a printing device with only out-of-printing fluid detection is used for unattended printing, the user has no way of ensuring that there is sufficient printing fluid in a partially used container to complete a printing job. For a large unattended print job, the user may choose to replace all of the printing fluid containers with new ones to ensure that none of them run out during printing. After the job is complete, the previous containers which still have some printing fluid may be placed back into the printing device. In this case, multiple containers with varying printing fluid amounts are in use, making it difficult to know how much printing fluid is in each container. It is desirable for the printing device user to know at all times how much printing fluid is in each container installed in the printing device.

Traditional methods of measuring the volume of a fluid in a container, such as floats or dip sticks, are not useful when a container changes shape as the printing fluid is used. This is the case for printing fluid bags which are designed to keep air from directly contacting the printing fluid. In this case, as the printing fluid is used, the ambient air pressure collapses the bag around the remaining printing fluid. This occurs non-uniformly such that the bag has no guaranteed shape as it collapses. Different methods have been proposed which would make the deformation more uniform allowing for a printing fluid level measurement by measuring the change in bag size. These methods include placing parallel plates on the sides of the bag which move towards each other as the bag collapses. A mechanical sensor or a capacitive sensor could be used to measure the separation of the plates from which the bag volume is calculated. These methods do not yield accurate estimates of the printing fluid volume.

The present invention proposes a different solution. The invention indirectly measures the amount of printing fluid in a printing fluid container by measuring the amount of air which can be placed into a fixed volume surrounding the printing fluid. Uniformity of container collapse for containers such as bags is no longer an issue. Also, the present invention allows fluid level sensing for bag containers where traditional fluid level sense techniques, such as floats or dip sticks, are difficult to use. Several possibilities exist for determining the amount of air and the volume it takes up at a particular temperature and pressure.

One aspect of the present invention relates to a fluid level detection system for determining the volume of fluid in a container ($V_{FLUID}$). This system includes a fluid container, a reference chamber that has a volume ($V_R$), a pressure chamber in which the container is placed, the pressure chamber having a volume ($V_P$), an air source, an air management system including at least one orifice, a pressure sensor that senses pressure, a time measurement device, and a computing device. The air management system is designed to selectively couple the air source to the reference chamber to pressurize the reference chamber to at least a first reference chamber pressure ($P_{R1}$), to selectively couple the air source to the pressure chamber to pressurize the pressure chamber to at least a first pressure chamber pressure ($P_{P1}$), to selectively couple the reference chamber to the orifice to discharge the reference chamber, and to selectively couple the pressure chamber to the orifice to discharge the pressure chamber. The time measurement device is designed to determine an elapsed time ($\Delta t_R$) for a pressure in the reference chamber to drop from pressure ($P_{R1}$) to a lower pressure ($P_{R2}$), as sensed by the pressure sensor, and to determine an elapsed time ($\Delta t_P$) for a pressure in the pressure chamber to drop from pressure ($P_{P1}$) to a lower pressure ($P_{P2}$), as sensed by the pressure sensor. The computing device is designed to determine a volume of air in the pressure chamber ($V_{AIR}$) based upon the reference chamber volume ($V_R$), the elapsed time ($\Delta t_R$), the elapsed time ($\Delta t_P$), and the pressures ($P_{R1}$), ($P_{R2}$), ($P_{P1}$), and ($P_{P2}$). Based upon this information, the computing device is also designed to determine the volume of fluid in the container ($V_{FLUID}$) based upon the pressure chamber volume ($V_P$) and the volume of air in the pressure chamber ($V_{AIR}$).

Another aspect of the present invention relates to a printing device that includes a printing mechanism that prints an image, a printing composition, a container in which the printing composition is stored, a control system that enables printing by the printing mechanism, a pressure chamber in which the container is placed, the pressure chamber having a volume ($V_P$), and a fluid level detection system for determining the volume of fluid in the container ($V_{FLUID}$). The container is coupled to the printing mechanism to deliver the printing composition to the printing mechanism to print the image. The fluid level detection system is designed to determine the volume of fluid in a container ($V_{FLUID}$) based upon the volume of air in the pressure chamber ($V_{AIR}$). The fluid level detection system of the printing device may include those components described above in connection with the first aspect of the present invention.

The above-described aspects of the present invention may be modified as follows. The air management system may include a first orifice through which the reference chamber is discharged and a second orifice through which the pressure chamber is discharged. The time measurement device and the computing device may include a microprocessor or a controller that actuates the air management system to control selective coupling of the reference chamber to the air source, the pressure chamber to the air source, the reference chamber to the orifice, and the pressure chamber to the orifice. This microprocessor or controller is coupled to the pressure sensor to receive data representative of the sensed pressure points.

The air source may include a pump and the air management system may include conduit between the pump and the reference chamber, conduit between the pump and the pressure chamber, at least one valve, actuable to control pressurization of the reference and pressure chambers, conduit between the orifice and the reference and pressure chambers, and a valve, actuable to control depressurization of the reference and pressure chambers via the orifice. The container may include a bag and the pressure chamber may include an air-tight bag surrounding the container. The pressure sensor may include a first pressure sensor that senses pressures $P_{R1}$ and $P_{P1}$ and a second pressure sensor that senses $P_{R2}$ and $P_{P2}$. For the printing device, the air source may pressurize the pressure chamber to pressurize the ink during printing of the printing device.

Another aspect of the present invention relates to a method for determining the volume of fluid in a container ($V_{FLUID}$) based upon the volume of air in a pressure chamber ($V_{AIR}$) having a volume ($V_P$). The method includes the steps of pressurizing a reference chamber having a volume ($V_R$) to at least a first reference chamber pressure ($P_{R1}$) discharging the reference chamber through a first orifice, sensing a decrease in pressure in the reference chamber from first reference chamber pressure ($P_{R1}$) to a second reference chamber pressure ($P_{R2}$) as the reference chamber is discharged, and determining an elapsed time ($\Delta t_R$) for a pressure in the reference chamber to drop from pressure ($P_{R1}$) to the pressure ($P_{R2}$). The method also includes the steps of pressurizing the pressure chamber to at least a first pressure chamber pressure ($P_{P1}$), discharging the pressure chamber through either the first orifice or a second orifice, sensing a decrease in pressure in the pressure chamber from first pressure chamber pressure ($P_{P1}$) to a second pressure chamber pressure ($P_{P2}$) as the pressure chamber is discharged, determining an elapsed time ($\Delta t_P$) for a pressure in the pressure chamber to drop from pressure ($P_{P1}$) to the pressure ($P_{P2}$), determining the volume of air in the pressure chamber ($V_{AIR}$) based upon the reference chamber volume ($V_R$), the elapsed time ($\Delta t_R$), the elapsed time ($\Delta t_P$), and the pressures ($P_{R1}$), ($P_{R2}$), ($P_{P1}$), and ($P_{P2}$). From this information, the volume of fluid in the container ($V_{FLUID}$) is determined based upon the pressure chamber volume ($V_P$) and the volume of air in the pressure chamber ($V_{AIR}$).

The above-described method may additionally include the step of refilling the container with the fluid if the volume of fluid in the container ($V_{FLUID}$) is either at a predetermined level or below a predetermined level. The above-described method may further include the step of signaling prior to refilling, if the volume of fluid in the container ($V_{FLUID}$) is at the predetermined level or below the predetermined level.

Another aspect of the present invention relates to an apparatus for use in a printing device that includes a container in which a printing composition is stored, a printing composition port coupled to the container for supplying printing composition from the container to the printing device, a pressure chamber in which the container is placed, the pressure chamber being configured to be airtight and to define a fixed volume, and an air port coupled to the pressure chamber. The air port is configured to supply air to the pressure chamber to pressurize the fixed volume of the pressure chamber.

The above-described apparatus may be modified as follows. The pressure chamber may include an airtight member and a body in which the airtight member is placed. The body limits expansion of the airtight member to the fixed volume during pressurization of the pressure chamber. The airtight member may include a bag or a shell. The container may include a first bag and the pressure chamber may include a second bag. The container may be removably placed in the pressure chamber so as to be separable therefrom. The air port may include a bidirectional valve actuable in a first direction to pressurize the pressure chamber and actuable in a second direction to depressurize the pressure chamber. The apparatus may further include an interconnect having a first conduit that couples to the container and the printing device to supply printing composition to the printing device, and a second conduit that couples to the pressure chamber and an air source to pressurize the pressure chamber. This interconnect is designed to couple the pressure chamber to the source after the container is coupled to the printing device to help prevent spilling of printing fluid.

Other objects, advantages, and novel features of the present invention will become apparent from the following detailed description of the invention when considered in conjunction with the accompanying drawings.

DETAILED DESCRIPTION OF THE DRAWINGS

Figure 1:
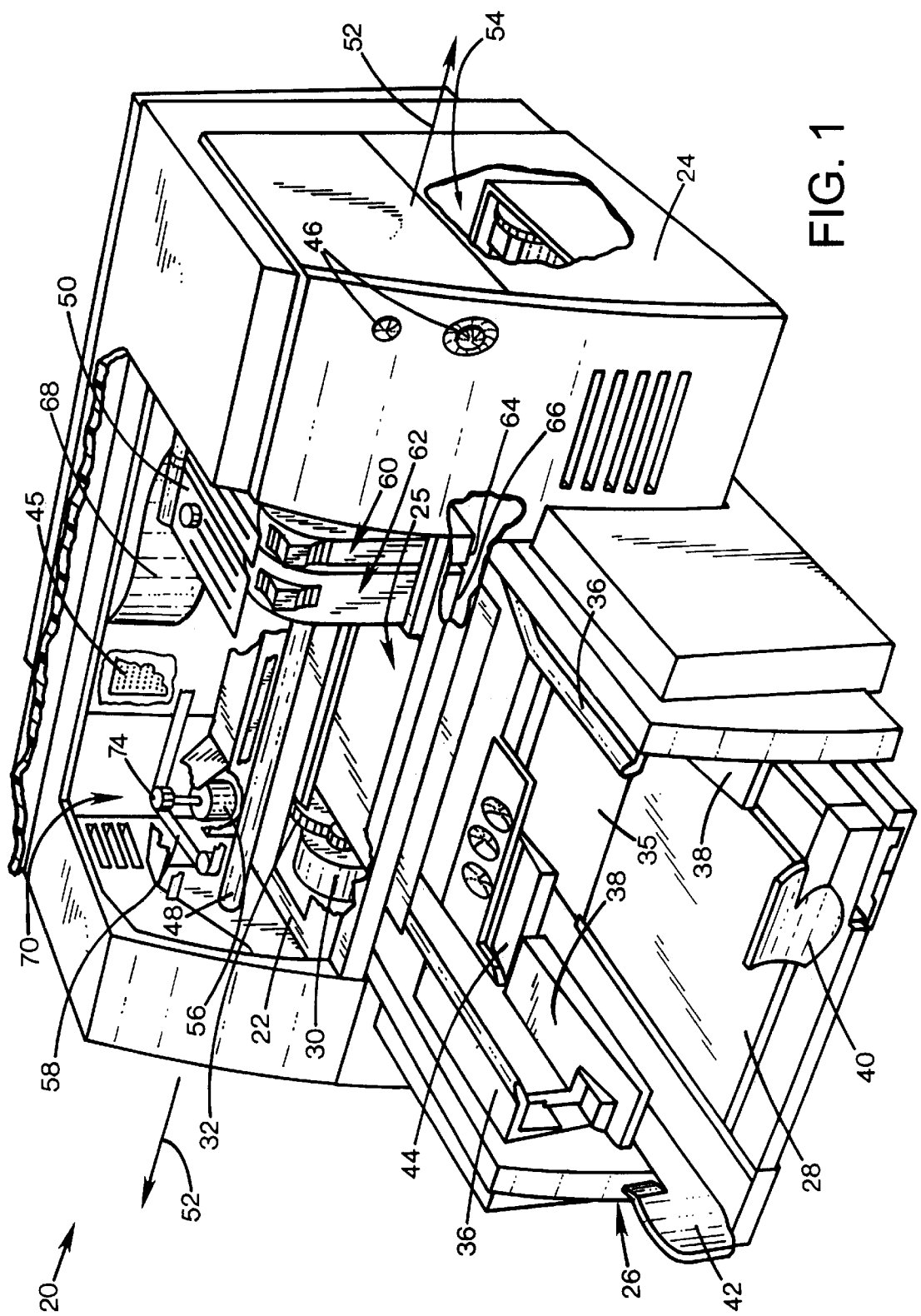
FIG. 1 illustrates is a partially cut away, perspective view of an inkjet printing device incorporating an embodiment of the present invention.

An embodiment of a printing device, here shown as an inkjet printer or printing device 20, constructed in accordance with the present invention is shown in FIG. 1. Inkjet printer 20 may be used for printing business reports, correspondence, desktop publishing, and the like, in an industrial, office, home or other environment. Although not shown, it is to be understood that the present invention may be used with a variety of other printing devices such as laser printers, plotters, portable printing units, copiers, cameras, video printers, and facsimile machines. For convenience, the concepts of the present invention are illustrated in the environment of an inkjet printer 20.

While it is apparent that the printer components may vary from model to model, the typical inkjet printer 20 includes a chassis or base 22 surrounded by a housing, casing or enclosure 24, typically of a plastic material. Sheets of print media are fed through a print zone 25 by a print media handling system 26. The print media may be any type of suitable sheet material, such as paper, card-stock, transparencies, mylar, and the like but, for convenience, the illustrated embodiment is described using paper as the print medium. The print media handling system 26 has a feed tray 28 for storing sheets of paper before printing. A series of conventional paper drive rollers (not shown), driven by a stepper motor 30 and drive gear assembly 32, may be used to move the print media, such as sheet 35, from tray 28 under a paper guide member 34 into the print zone 25 for printing.

After printing, the motor 30 drives the printed sheet 35 onto a pair of retractable output drying wing members 36. The wings 36 momentarily hold the newly printed sheet above any previously printed sheets still drying in an output tray portion 38 before retracting to the sides to drop the newly printed sheet into the output tray 38. The media handling system 26 may include a series of adjustment mechanisms for accommodating different sizes of print media, including letter, legal, A-4, envelopes, etc., such as a sliding length adjustment lever 40, a sliding width adjustment lever 42, and a sliding envelope feed plate 44.

The printer 20 also has a printer controller or control system, illustrated schematically as a microprocessor 45, that receives instructions from a host device, typically a computer, such as a personal computer (not shown). The printer controller 45 may also operate in response to user inputs provided through a key pad 46 located on the exterior of the casing 24. A monitor (not shown) coupled to the computer host may be used to display visual information to an operator, such as the printer status or a particular program being run on the host computer. Personal computers, their input devices, such as a keyboard and/or a mouse device, and monitors are all well known to those skilled in the art.

A carriage guide rod 48 is supported by the chassis 22 to slideably support a carriage system 50 for travel back and forth across the print zone 25. Carriage 50 is also propelled along guide rod 48 into a servicing region 54, as indicated generally by arrows 52, located within the interior of the housing 24. Carriage 50 has a pair of bearings which slideably support the carriage as it travels along the guide rod 48. A carriage DC motor 56 drives an endless belt 58. The motor 56 operates in response to control signals received from the controller 45. The belt 58 may be secured in a conventional manner to the carriage 50 to incrementally advance the carriage along guide rod 48 in response to actuation of motor 56.

In the print zone 25, the media sheet 35 receives ink from one or more printing fluid or printing composition containers, such as a black ink container 60 and/or a color ink container 62. Containers 60, 62 have printing mechanisms or printheads 64, 66 respectively, each of which have an orifice plate with a plurality of nozzles formed therethrough in a manner well known to those skilled in the art. The illustrated printheads 64, 66 are thermal inkjet printheads, although other types of printheads may be used, such as piezoelectric printheads. The printheads 64, 66 typically include a plurality of resistors which are associated with the nozzles. Upon energizing a selected resistor, a bubble of gas is formed ejecting a droplet of ink from the nozzle and onto a sheet of paper in the print zone 25 under the nozzle. The printhead resistors are selectively energized in response to firing command control signals delivered by a multi-conductor strip 68 from the controller 45 to the printhead carriage 50.

Figure 2:
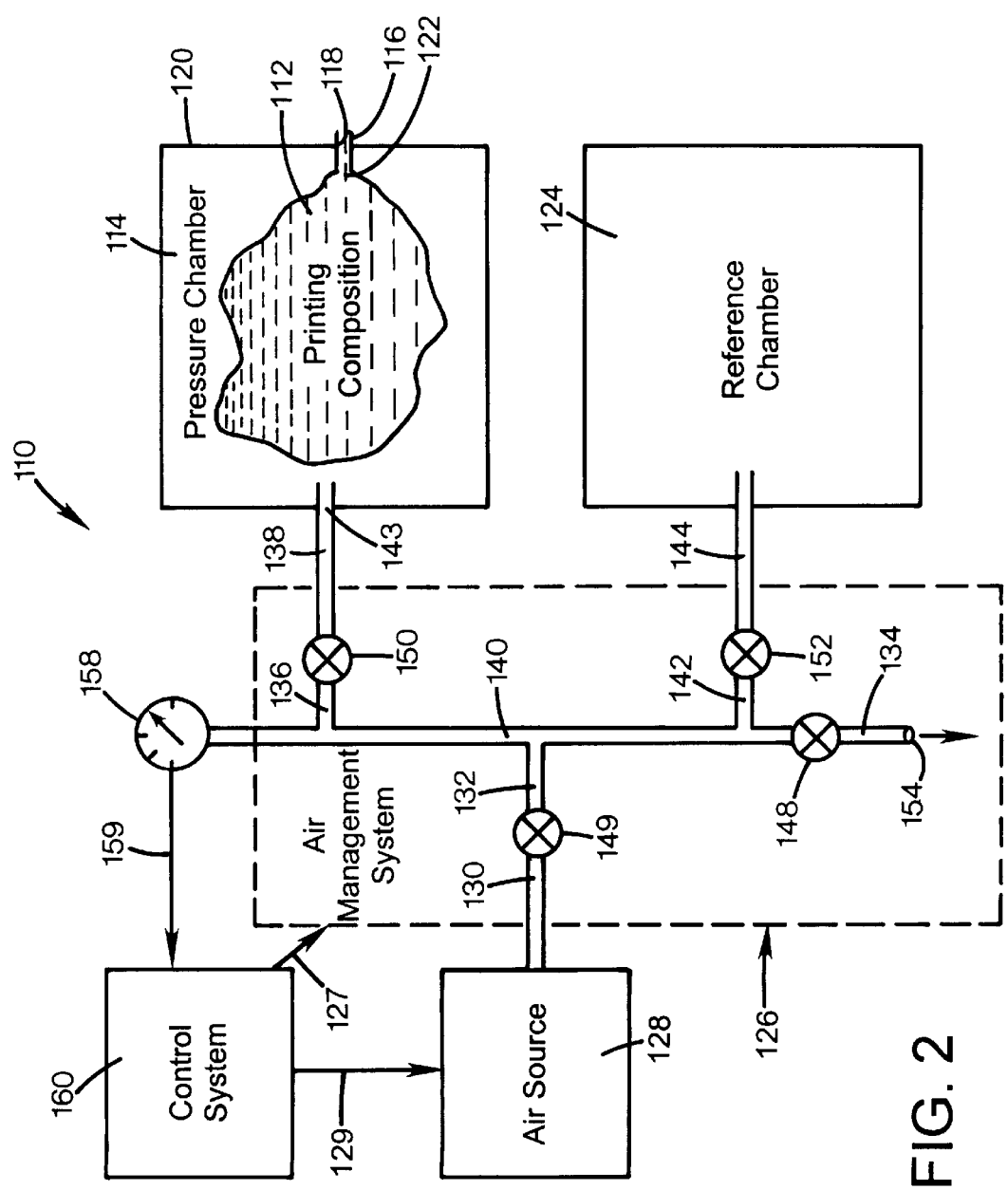
FIG. 2 shows a diagram of a fluid level detection system constructed in accordance with the present invention.

FIG. 2 shows a diagram of a fluid level detection system 110 constructed in accordance with the present invention that may be used in a printing device, such as an ink jet printer 20, to determine the volume of printing fluid in a printing fluid container, as discussed more fully below. Fluid level detection system 110 may also find application in other types of printing devices such as laser printers, plotters, portable printing units, copiers, cameras, video printers, and facsimile machines. Fluid level detection system 110 includes a container 112 which is filled with a printing fluid or printing composition, such as ink or toner. Container 112 is disposed in and surrounded by a pressure chamber 114 that has a volume $V_P$. Container 112 may be made from such things as a bag or cartridge. Pressure chamber 114 may be made from one or more things such as a bag, cartridge, shell, bottle, body, or housing, as more fully discussed below. A printing composition supply line 116 extends through opening 118 in wall 120 of pressure chamber 114 and is coupled to printing composition port 122 to supply printing fluid to the printing device. A seal (not shown) in opening 118 through which supply line 116 extends is used to help prevent air from escaping pressure chamber 114.

Fluid level detection system 110 also includes a reference chamber 124 having a volume $V_R$ and an air source 128, such as a pump or container of pressurized air. Reference chamber 124 may also be made from such things as a bag, cartridge, shell, bottle, body or housing. Pressure chamber 114 and reference chamber 124 are connected to an air management system 126.

Air management system 126 includes conduit 130, 132, 134, 136, 138, 140, 142, and 144, valves 148, 149, 150, and 152, and a discharge orifice 154. Conduit 130, 132, 134, 136, 138, 140, 142, and 144 may be made from various materials such as plastic tubing. Conduit 138 is coupled to air port 143 of pressure chamber 114. Air port 143 is configured to supply air from source 128 to pressure chamber 114 to pressurize the fixed volume of pressure chamber 114, as more fully discussed below. In one or more embodiments of system 110, air port 143 may include a bi-directional valve actuable in a first direction to pressurize pressure chamber 114 and actuable in a second direction to depressurize pressure chamber 1 14.

Valves 150 and 152 control which chamber is pressurized or depressurized at any given time, while valve 148 prevents air from escaping through discharge orifice 154 during pressurization. Valve 149 helps prevent air from escaping through air source 128 during discharge. Although not shown, it is to be understood that one or more of valves 148, 149, 150, and 152 may be replaced with multi-port valves. For example, valves 150 and 152 may be combined and replaced with a single multi-port valve. As a further example, valves 148, 149, 150, and 152 may be combined and replaced with a single multi-port valve.

Although only a single discharge orifice 154 is shown, it is to be understood that one or more alternative embodiments of the present invention may use multiple discharge orifices. For example, pressure chamber 114 may discharged through a first discharge orifice and reference chamber 124 through a second discharge orifice. Such an arrangement allows for simultaneous discharge of pressure chamber 114 and reference chamber 124.

Fluid level detection system 110 further includes a pressure sensor 158 designed to sense pressure points or measure pressure and a control system 160 coupled to air management system 126, air source 128, and pressure sensor 158. Control system 160 actuates air source 128, as indicated by arrow 129, valves 148, 149, 150, and 152 of air management system 126, as indicated by arrow 127, and receives data signals from pressure sensor 158 representative of pressure, as indicated by arrow 159. Control system 160 may include such things as a microprocessor or a controller. Although a single pressure sensor 158 is shown, it is to be understood that other embodiments of detection system 110 may include multiple sensors.

Figure 3:
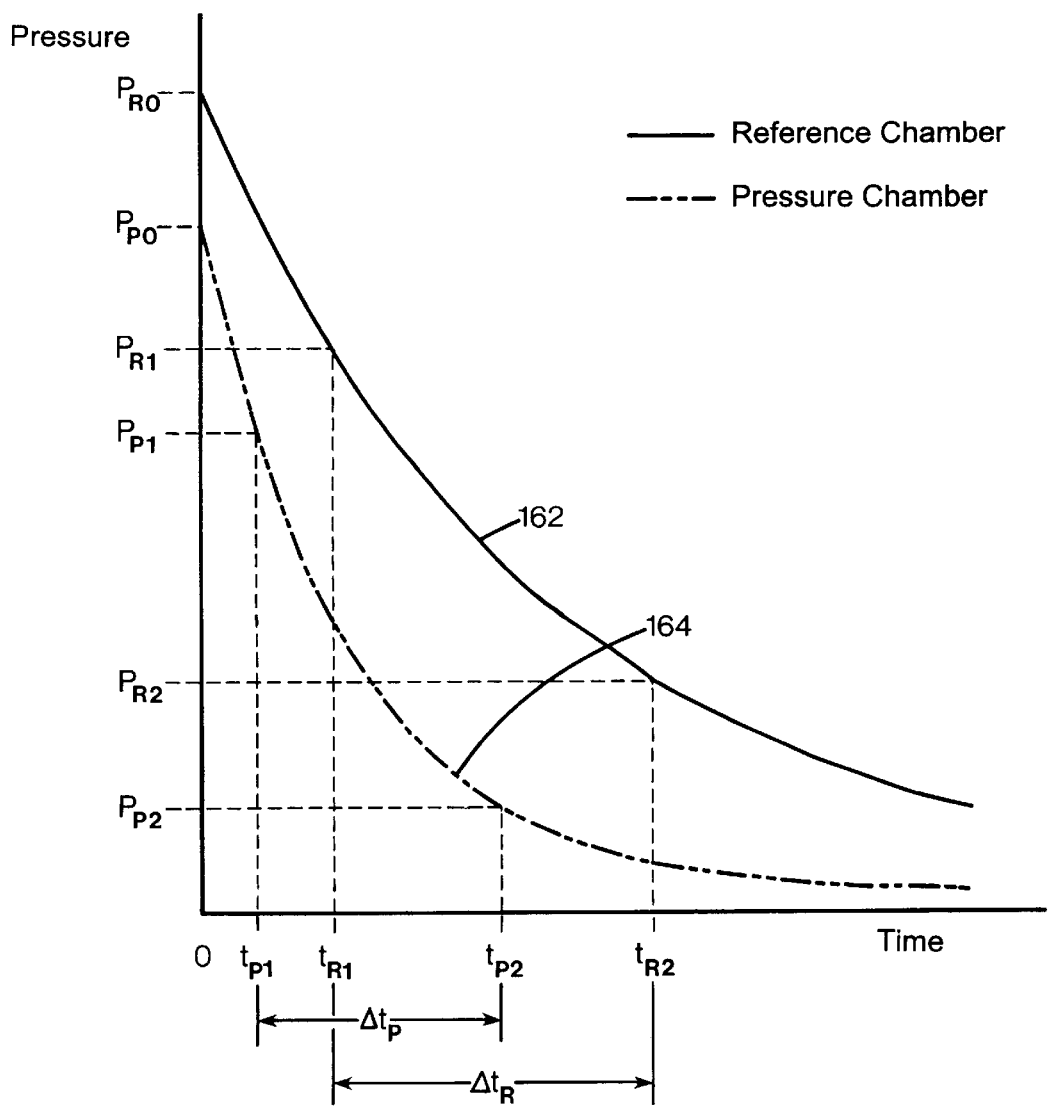
FIG. 3 shows graphs of pressure versus time for the fluid level detection system of FIG. 2.

Fluid level detection system 110 may be operated as follows to determine the volume of printing fluid in container 112. First, valves 148 and 150 are closed, then valves 149 and 152 are opened. Next, reference chamber 124 with volume $V_R$ is pressurized using air source 128 to an initial pressure $P_{R0}$ equal to or greater than a pressure $P_{R1}$. Flow of air from air source 128 is then blocked, for example, by shutting valve 149. The air in reference chamber 124 is then discharged through discharge orifice 154 by opening valve 148. The decrease in pressure in reference chamber 124 is sensed or measured via pressure sensor 158. Control system 160 includes a time measurement device (not shown) that determines an elapsed time ($\Delta t_R$) for the pressure in reference chamber 124 to drop from a pressure $P_{R1}$ at time $t_{R1}$ to a lower pressure $P_{R2}$ at time $t_{R2}$, as air escapes reference chamber 124 via discharge orifice 154. A graph 162 of the pressure in reference chamber 124 as a function of time is given in FIG. 3.

Next, valves 148 and 152 are closed, then valves 149 and 150 are opened. Pressure chamber 114 with volume $V_P$ is then pressurized using air source 128 to an initial pressure $P_{P0}$ equal to or greater than pressure $P_{P1}$. Flow of air from air source 128 is then blocked, for example, by shutting valve 149. The air in pressure chamber 114 is then discharged through discharge orifice 154 by opening valve 148. The decrease in pressure in pressure chamber 114 is sensed or measured via pressure sensor 158. The time measurement device (not shown) of control system 160 determines an elapsed time ($\Delta t_P$) for the pressure in pressure chamber 114 to drop from a pressure $P_{P1}$ at time $t_{P1}$) a lower pressure $P_{P2}$ at time $t_{P2}$, as air escapes pressure chamber 114 via discharge orifice 154. A graph 164 of the pressure in pressure chamber 114 as a function of time is given in FIG. 3. Orifice 154 is a small opening that limits the rate of air flow during these discharges to allow sufficient time for these measurements to occur.

Assuming that air can be modeled as an ideal gas, the Ideal Gas Law then describes the relationship between temperature (T), pressure (P), and volume (V) for a given quantity of air (n) in a chamber.

$$pV = nRT \quad \text{where } R = \text{Molar Gas Constant} \qquad (1)$$

Assuming a constant volume and temperature:

$$p = \left(\frac{RT}{V}\right)n \quad \text{where } n = \text{number of moles of air} \qquad (2)$$

where $$n = \text{number of moles of air} \qquad (2)$$

The time rate of change of pressure in a chamber as a function of the molar flow rate of the air out of an orifice is:

$$\frac{dp}{dt} = \frac{RT}{V}\frac{dn}{dt} \quad \text{or} \quad p' = \frac{RT}{V}n' \qquad (3)$$

Assuming an isothermal flow, the molar flow rate of air out of the orifice is modeled as a linear function of pressure:

$$n' = \frac{dn}{dt} = Kp \quad \text{where } K = \text{flow constant} \qquad (4)$$

where $$K = \text{flow constant} \qquad (4)$$

Combining Eq. 3 and Eq. 4 gives pressure as a function of time:

$$p' = \left(\frac{RT}{V}\right)Kp \quad \text{or} \quad p' - \left(\frac{RT}{V}K\right)p = 0 \qquad (5)$$

Solving the above first order differential equation:

$$p(t) = P_0 e^{-\left(\frac{RT}{V}K\right)t} \quad \text{where } P_0 = \text{initial pressure}. \qquad (6)$$

where $$P0 = \text{initial pressure}. \qquad (6)$$

Applying this exponential decay to the air which surrounds a printing fluid container in a pressure chamber where $P_{P0}$ is the initial pressure in the pressure chamber, $P_{P1}$ is the first pressure point, $P_{P2}$ is the second pressure point, and $V_{AIR}$ is the volume of the air in the pressure chamber:

$$P_{P1} = P_{P0} e^{-\left(\frac{RT}{V_{AIR}}K\right)t_{P1}} \qquad (7)$$

$$P_{P2} = P_{P0} e^{-\left(\frac{RT}{V_{AIR}}K\right)t_{P2}} \qquad (8)$$

Combining Eq. 7 and Eq. 8

$$\frac{P_{P2}}{P_{P1}} = e^{-\left(\frac{RT}{V_{AIR}}K\right)t_{P2}} / e^{-\left(\frac{RT}{V_{AIR}}K\right)t_{P1}} = e^{-\left(\frac{RT}{V_{AIR}}K\right)(t_{P2} - t_{P1})} \qquad (9)$$

$$\frac{P_{P2}}{P_{P1}} = e^{-\left(\frac{RT}{V_{AIR}}K\right)\Delta t_P} \qquad (10)$$

$$\frac{V_{AIR}}{\Delta t_P}\ln\left(\frac{P_{P2}}{P_{P1}}\right) = -RTK \qquad (11)$$

A similar equation to Eq. 11 can be written for a reference chamber, except that here the volume of air is equal to the volume of the reference chamber $V_R$:

$$\frac{V_R}{\Delta t_R}\ln\left(\frac{P_{R2}}{P_{R1}}\right) = -RTK \qquad (12)$$

Combining Eq. 11 and Eq. 12:

$$\frac{V_{AIR}}{\Delta t_P}\ln\left(\frac{P_{P2}}{P_{P1}}\right) = \frac{V_R}{\Delta t_R}\ln\left(\frac{P_{R2}}{P_{R1}}\right) \qquad (13)$$

$$\boxed{V_{AIR} = V_R \frac{\Delta t_P}{\Delta t_R}\ln\left(\frac{P_{R2}}{P_{R1}} - \frac{P_{P2}}{P_{P1}}\right)} \qquad (14)$$

For the simplifying condition where $P_{R1} = P_{P1}$ and $P_{R2} = P_{P2}$. The volume of air in the pressure chamber $V_P$ can be calculated from the known volume of the reference chamber $V_R$ and the two decay times $\Delta t_P$ and $\Delta t_R$:

$$\boxed{V_{AIR} = V_R \frac{\Delta t_P}{\Delta t_R}} \qquad (15)$$

Knowing the volume in the pressure chamber $V_P$ which is available for air when there is no fluid, the volume of fluid can be calculated:

$$\boxed{V_{FLUID} = V_P - V_{AIR}} \quad (16)$$

Improved accuracy in fluid level measurement is possible by choosing a mathematical model of the molar flow rate of air out of the orifice which does not assume isothermal air flow, as assumed above. Such a model may account for such things as temperature variations at the orifice during pressure chamber and reference chamber discharge. Improved accuracy is also possible by selecting similar volumes for the reference chamber and the pressure chamber.

Figure 4:
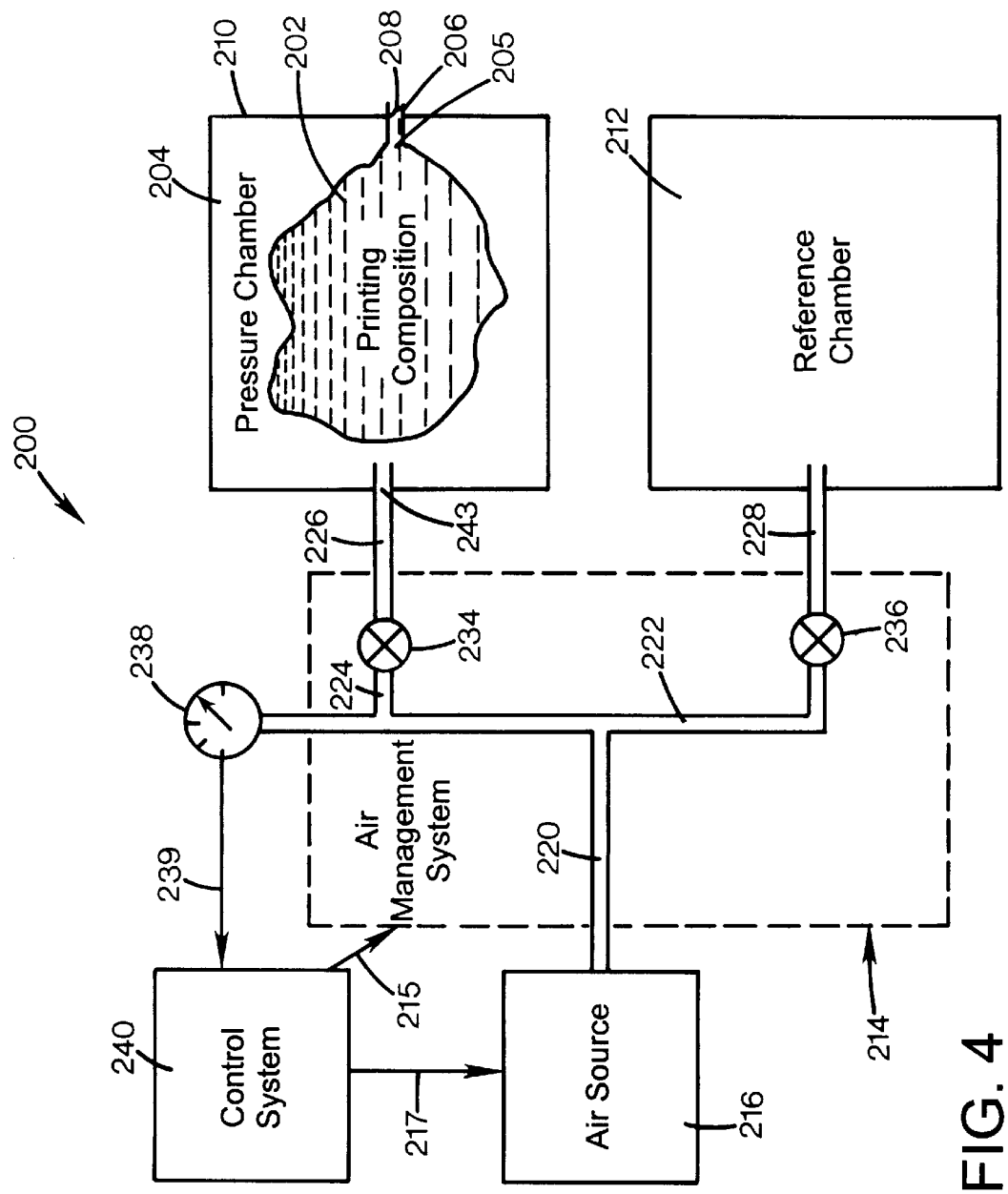
FIG. 4 shows a diagram of an alternative embodiment of a fluid level detection system constructed in accordance with the present invention.

FIG. 4 shows a diagram of an alternative embodiment of a fluid level detection system 200 constructed in accordance with the present invention that may be used in a printing device, such as ink jet printer 20, to determine the volume of printing fluid in a printing fluid container 202, as discussed more fully below. Fluid level detection system 200 may also find application in other types of printing devices such as laser printers, plotters, portable printing units, copiers, cameras, video printers, and facsimile machines. Fluid level detection system 200 includes container 202 which is filled with a printing fluid or printing composition such as ink or toner. Container 202 may be made from such things as a bag or cartridge. Container 202 is surrounded by a pressure chamber 204 that has a volume $V_P$ and may be made from one or more things such as a bag, cartridge, shell, bottle, body, or housing. A printing composition supply line 206 extends through an opening 208 in wall 210 of pressure chamber 204 and is coupled to printing composition port 205 to supply printing fluid to the printing device. A seal (not shown) in opening 208 through which supply line 206 extends is used to help prevent air from escaping pressure chamber 204.

Fluid level detection system 200 also includes a reference chamber 212 having a volume $V_R$, that may also be made from such things as a bag, cartridge, shell, bottle, body, or housing, and an air source 216, such as a cyclical pump. Pressure chamber 204 and reference chamber 212 are connected to an air management system 214.

Air management system 214 includes conduit 220, 222, 224, 226, and 228, and valves 234 and 236. Conduit 220, 222, 224, 226, and 228 may be made from various materials such as plastic tubing. Conduit 226 is coupled to air port 243 of pressure chamber 204. Air port 243 is configured to supply air from source 216 to pressure chamber 204 to pressurize the fixed volume of pressure chamber 204, as more fully discussed below. In one or more embodiments of system 200, air port 243 may include a bi-directional valve actuable in a first direction to pressurize pressure chamber 204 and actuable in a second direction to depressurize pressure chamber 204.

Valves 234 and 236 control which chamber is pressurized or depressurized at any given time. Although not shown, it is to be understood that valves 234 and 236 may be replaced with a multi-port valve. For example, valves 234 and 236 may be combined and replaced with a single multi-port valve.

Fluid level detection system 200 further includes a pressure sensor 238 designed to sense pressure points or measure pressure and a control system 240 coupled to air management system 214, air source 216, and pressure sensor 238. Control system 240 actuates air source 216, as indicated by arrow 217, valves 234, and 236 of air management system 214, as indicated by arrow 215, and receives data signals from pressure sensor 238 representative of pressure, as indicated by arrow 239. Control system 240 may include such things as a microprocessor or a controller. Although a single pressure sensor 238 is shown, it is to be understood that other embodiments of detection system 200 may include multiple sensors.

Fluid level detection system 200 may be operated as follows to determine the volume of printing fluid in container 202. First, valve 234 is closed, then valve 236 is opened. Next, reference chamber 212 with volume $V_R$ is pressurized using air source 216 to a pressure $P_{R0}$, as measured or sensed by pressure sensor 238. The number of cycles of the cyclical pump of air source 216 needed to raise the pressure in reference chamber 212 to $P_{R0}$ is counted by a counter (not shown) of control system 240. The air in reference chamber 212 is then discharged through, for example, air source 216.

Next, valve 234 is opened and valve 236 closed. Pressure chamber 204 with volume $V_P$ is then pressurized using air source 216 to a pressure equal to pressure $P_{P0}$, as measured or sensed by pressure sensor 238. The number of cycles of the cyclical pump of air source 216 needed to raise the pressure in pressure chamber 204 to a pressure $P_{P0}$ is counted by the counter of control system 240. The air in pressure chamber 204 is then discharged through, for example, air source 216.

Based upon this information, the volume of printing fluid in container 202 may be determined. Starting with the Ideal Gas Law stated in Eq. 1 and its associated assumptions, the amount of air in a chamber of a cyclical pump having volume ($V_{pump}$) at ambient temperature ($T_A$) and pressure ($P_A$) is $$n_{pump} = \frac{P_A V_{pump}}{RT_A} \quad (17)$$

Similarly, the amount of air ($N_P$) in a pressure chamber at pressure $P_{P0}$ and the amount of air ($N_R$) in a reference chamber at pressure $P_{R0}$, respectively, are $$N_P = m_P \cdot n_{pump} = \frac{P_{P0} V_{AIR}}{RT_A} \quad (18)$$

where $m_P$=# of counts of the cyclical pump to raise the pressure in the pressure chamber to $P_{P0}$ and $V_{AIR}$=volume of air in the pressure chamber.

$$N_R = m_R \cdot n_{pump} = \frac{P_{R0} V_R}{RT_A} \quad (19)$$

where $m_R$=# of counts of the cyclical pump to raise the pressure in the reference chamber to $P_{R0}$ and $V_R$=volume of reference chamber.

Combining Eq. 17, 18, and 19 and solving for the volume of air ($V_{AIR}$) in the pressure chamber $$\boxed{V_{AIR} = \frac{m_P}{m_R} \frac{P_{R0}}{P_{P0}} V_R} \quad (20)$$

For the simplifying case where $P_{R0} = P_{P0}$, $$V_{AIR} = \frac{m_P}{m_R} V_R \quad (21)$$

Knowing the volume ($V_P$) in the pressure chamber which is available for air when there is no fluid, the volume of fluid ($V_{FLUID}$) can be calculated:

$$V_{FLUID} = V_P - V_{AIR} \quad (22)$$

Figure 5:
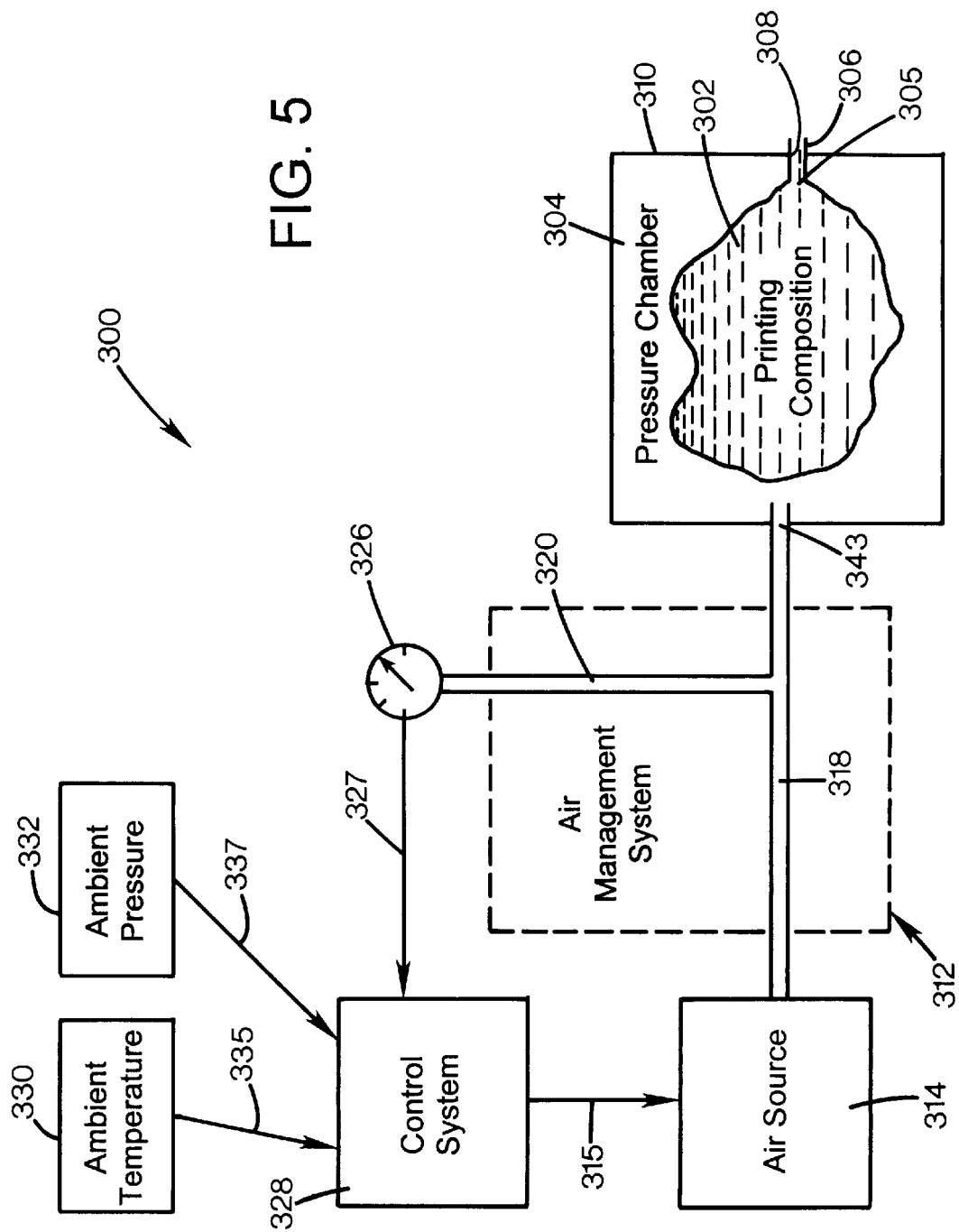
FIG. 5 shows a diagram of yet another alternative embodiment of a fluid level detection system constructed in accordance with the present invention.

FIG. 5 shows a diagram of yet another alternative embodiment of a fluid level detection system 300 constructed in accordance with the present invention that may be used in a printing device, such as ink jet printer 20, to determine the volume of printing fluid in a printing fluid container, as discussed more fully below. Fluid level detection system 300 may also find application in other types of printing devices such as laser printers, plotters, portable printing units, copiers, cameras, video printers, and facsimile machines. Fluid level detection system 300 includes a container 302 which is filled with a printing fluid such as ink or toner. Container 302 may be made from such things as a bag or cartridge. Container 302 is surrounded by a pressure chamber 304 that has a volume $V_P$ and may be made from one or more such things as a bag, cartridge, shell, bottle, body, or housing. For example, pressure chamber 304 may include an airtight bag that surrounds container 302 and a body in which the airtight bag is disposed, the body limiting expansion of the airtight member to a fixed volume during pressurization of pressure chamber 304, as more fully discussed below. A printing composition supply line 306 extends through an opening 308 defined by wall 310 of pressure chamber 304 and is coupled to printing composition port 305 to supply printing fluid to the printing device. A seal (not shown) in opening 308 through which supply line 306 extends is used to help prevent air from escaping pressure chamber 304.

Fluid level detection system 300 also includes an air source 314, such as a cyclical pump, and an air management system 312. Air management system 312 includes conduit 318 and 320. Conduit 318 and 320 may be made from various materials such as plastic tubing. Conduit 318 is coupled to air port 343 of pressure chamber 304. Air port 343 is configured to supply air from source 314 to pressure chamber 304 to pressurize the fixed volume of pressure chamber 304, as more fully discussed below. In one or more embodiments of system 300, air port 343 may include a bi-directional valve actuable in a first direction to pressurize pressure chamber 304 and actuable in a second direction to depressurize pressure chamber 304.

Fluid level detection system 300 further includes a pressure sensor 326 designed to sense pressure points or measure pressure and a control system 328 coupled to air source 314, pressure sensor 326, ambient temperature sensor 330, and ambient pressure sensor 332. Control system 328 actuates air source 314, as indicated by arrow 315, and receives data signals from pressure sensor 326 representative of pressure, as indicated by arrow 327. Control system 328 may include such things as a microprocessor or a controller. Although a single pressure sensor 326 is shown, it is to be understood that detection system 300 may include multiple sensors.

Fluid level detection system 300 may be operated as follows to determine the volume of printing fluid in container 302. First, pressure chamber 304 with volume $V_P$ is pressurized using air source 314 to a pressure equal to pressure $P_{P0}$, as measured or sensed by pressure sensor 326. The number of cycles of the cyclical pump of air source 314 needed to raise the pressure in pressure chamber 304 to a pressure $P_{P0}$ is counted by a counter (not shown) of control system 328. The air in pressure chamber 304 is then discharged through, for example, air source 314. Ambient temperature and ambient pressure are sensed or measured by sensors 330 and 332 which are coupled to control system 328 to transmit data signals thereto representative of the sensed or measured ambient temperature and ambient pressure as generally indicated by arrows 335 and 337.

Based upon this information, the volume of printing fluid in container 202 may be determined. Starting with the Ideal Gas Law stated in Eq. 1 and its associated assumptions, the amount of air in a chamber of a cyclical pump having volume ($V_{pump}$) at ambient temperature ($T_A$) and pressure ($P_A$) is $$n_{pump} = \frac{P_A V_{pump}}{RT_A} \quad (23)$$

Similarly, the amount of air ($N_P$) in a pressure chamber at pressure $P_{P0}$ is $$N_P = m_P \cdot n_{pump} = \frac{P_{P0} V_{AIR}}{RT_A} \quad (24)$$

where $m_P$=# of counts of the cyclical pump to raise the pressure in the pressure chamber to $P_{P0}$ and $V_{AIR}$ =volume of air in the pressure chamber.

Combining Eq. 17 and Eq. 18, and solving for the volume of air ($V_{AIR}$) in the pressure chamber $$V_{AIR} = m_P \frac{P_A}{P_{P0}} V_{pump} \quad (25)$$

Knowing the volume ($V_P$) in the pressure chamber which is available for air when there is no fluid, the volume of fluid ($V_{FLUID}$) can be calculated:

$$V_{FLUID} = V_P - V_{AIR} \quad (26)$$

It should be noted that the present invention may be extended to include more than one printing fluid container. Only one air source, reference chamber, pressure sensor, and discharge orifice need be used. The only additional requirement is an additional value or opening in a multi-port valve for each printing fluid container to link it to the air conduit. It is also possible to use a separate pressure sensor and discharge orifice for each printing fluid container. The drawback of such a system is that each of these elements would need to be calibrated. The advantages include that all of the chambers can be discharged at the same time.

The pressure level sensor used in the fluid level detection system of the present invention does not have to be a continuous pressure level sensor. Discrete pressure level detectors can also be used. For discrete pressure level detectors to work for fluid level detection system 110, at least two pressure levels need to be established and there needs to be a means for measuring the time it takes the air pressure to go between those two levels. If the air source can stop pressurizing at the same high pressure level every time, then only a single pressure sensor for the lower pressure level is needed.

The fluid level detection system of the present invention may also used during printing to propel printing fluid from the printing fluid containers to printing units of the printing device, such as printheads. The pressure sensors of the fluid level detection system of the present invention may also be used to verify the integrity of the printing fluid delivery systems by monitoring pressure levels and looking for leaks while the system is pressurized.

Figure 6:
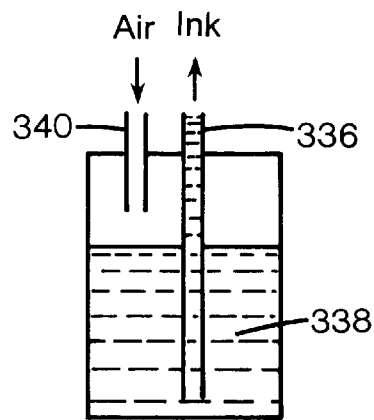
FIG. 6 shows an example of a fluid interconnect orientation scheme in accordance with the present invention.

It should be noted that the air source of the fluid level detection system of the present invention does not have to be adjacent a printing fluid container. The air source can be located anywhere within or adjacent to the printing device, giving more flexibility to printing fluid container location. The printing fluid containers themselves do not have to be in any particular orientation either. The fluid level detection system of the present invention will work with any orientation. This provides more design freedom in locating printing fluid containers and in locating the position of the fluid interconnects on the containers. For example, it is possible to have printing fluid interconnect 336 on top of a printing fluid container 338 as shown in FIG. 6. Also shown is an air supply interconnect 340 that supplies air to container 338. Placing printing fluid interconnect of top of container 338 minimizes the severity of printing fluid leaks, should one occur, by preventing the entire contents of the ink container from leaking out.

Figure 7:
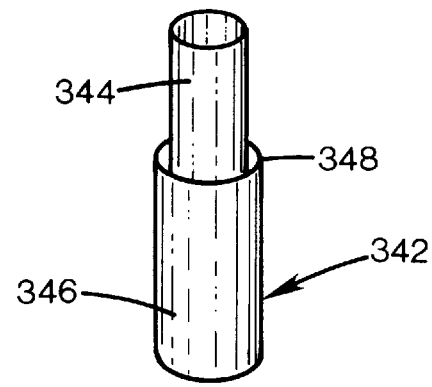
FIG. 7 shows an example of a fluid supply and pressure interconnect in accordance with the present invention.

The pressure chamber of the fluid level detection system of the present invention should preferably make connection to air management system after the printing fluid system makes connection to the printing device. Also, the pressure chamber should preferably break connection before the printing fluid system breaks connection. This will help ensure that printing fluid containers are always depressurized during connection or disconnection. A concentric interconnector 342 designed to accomplish this is shown in FIG. 7. As can be seen in FIG. 7, printing fluid line 344 is surrounded by concentric air line 346. As can also be seen in FIG. 7, fluid line 344 protrudes beyond end 348 of air line 346 which is the area of connection for lines 344 and 346.

The pressure chamber which surrounds the printing fluid can be implemented in a number of different ways. The key elements are that a 'known' volume of 'air-tight' space must surround the printing fluid which is to be measured. This space can be a part of the printing device, the printing fluid container, or both.

Figure 8:
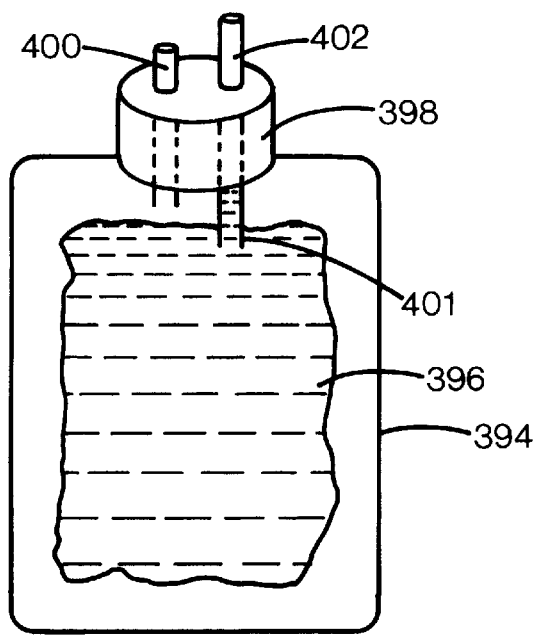
FIGS. 8–12 illustrate various embodiments of a pressure chamber and printing composition container constructed in accordance with the present invention.

As shown in FIG. 8, the pressure chamber can be a hard case 394 that defines a fixed volume, such as a shell or bottle, surrounding a flexible printing composition bag 396. Case 394 is sealed by a cap 398 in FIG. 8 through which air line 400 and line 402 of container 396 extend. Air line 400 is coupled to a port (not shown) of case 394 and supplies air to the fixed volume of case 394. Line 402 is coupled to port 401 of bag 396 and supplies printing composition to a printing device.

Figure 9:
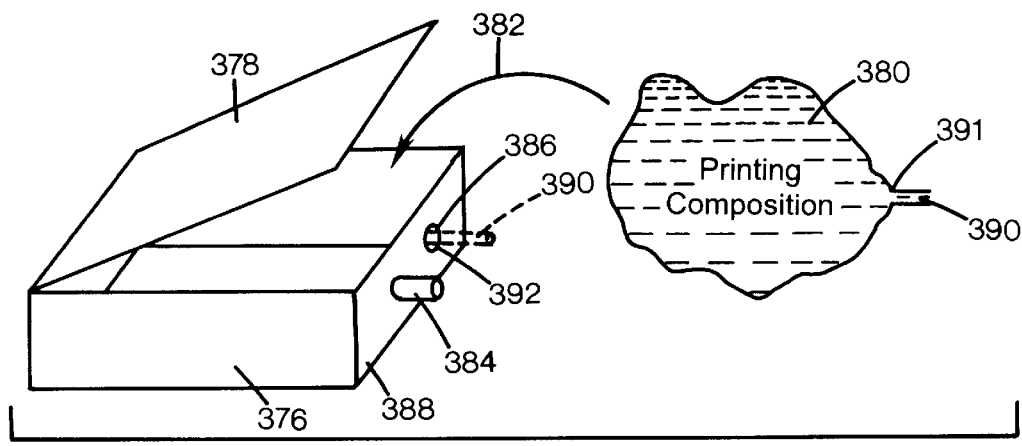

In the printing device, as shown in FIG. 9, the pressure chamber can be a an air-tight chamber 376 with a sealable door or lid 378 in which a printing composition container 380 is disposed, as generally indicated by arrow 382. Chamber 376 defines a fixed volume when lid 378 is closed. Chamber 376 includes an air line or air port 384 configured to supply air to chamber 376 to pressurize the fixed volume of chamber 376. Chamber 376 also includes an opening 386 defined by wall 388 through which line 390 extends when container 380 is disposed in chamber 376. Line 390 is coupled to printing composition port 391 of container 380. Opening 386 is sealed by seal 392 as shown in FIG. 9.

Figure 10:
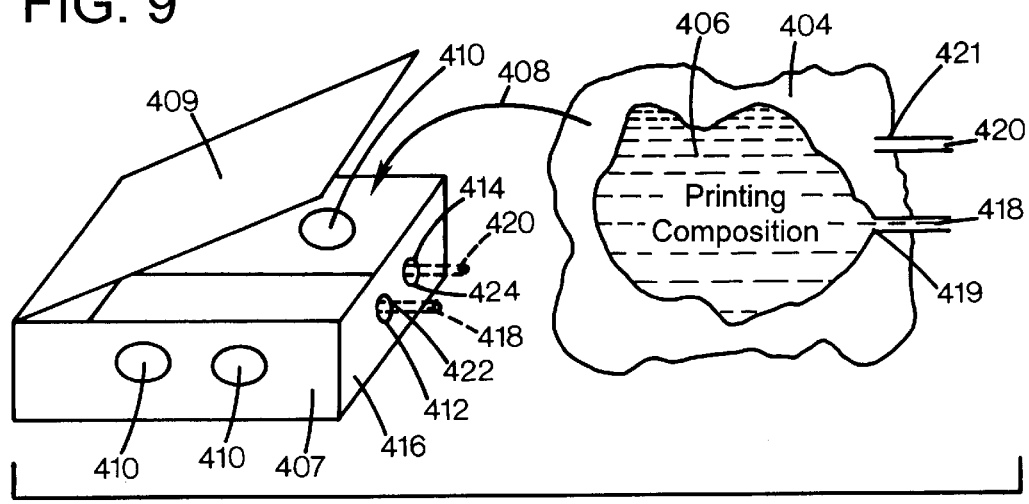

The functions of known or fixed volume and air-tightness of the pressure chamber do not have to be provided by the same structures. For example, as noted above and shown in FIG. 10, a flexible bag 404 can be placed around the printing composition container 406, also shown as a bag. Flexible bag 404 provides the air-tightness while the controlling volume is part of the printing device, shown as a non-air-tight chamber 407 of fixed volume in which bag 404 and container 406 are disposed, as generally indicated by arrow 408. Container 407 is shown as including a lid 409 and its non-air-tightness is symbolically illustrated by holes 410. Openings 412 and 414 in container 407 are defined by wall 416. Line 418 is coupled to printing composition port 419 of printing composition container 406 and extends through opening 412. Air line 420 is coupled to port 421 of bag 404, supplies air to bag 404, and extends through opening 414, as shown in FIG. 10. Openings 412 and 414 are sealed by respective seals 422 and 424. In this embodiment, the known or fixed volume of space does not have to be air-tight making it less expensive and easier to construct, because the air-tight function is accomplished by the second flexible bag.

Figure 11:
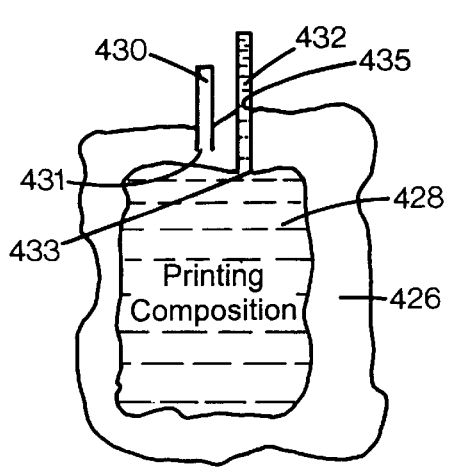
Figure 12:
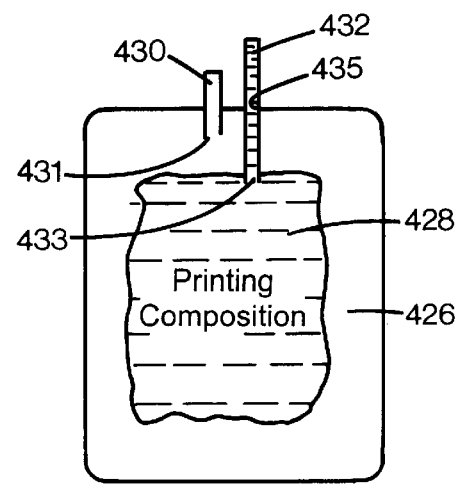

As a further example, as shown in FIG. 11, a second flexible bag 426 can function as a pressure chamber by being placed around the printing composition container 428, also shown as a bag. Bag 426 is air-tight and, when pressurized with a gas, such as air, expands to a known or fixed volume of space, as shown in FIG. 12. Second flexible bag 426 includes an air line 430 coupled to air port 431 of bag 426 and configured to supply air to bag 426 to pressurize the fixed or known volume of bag 426. Bag 426 also includes an opening 435 through which line 432 of container 428 extends when container 428 is disposed in bag 426 to couple with printing composition port 433 of container 428.

Figure 13:
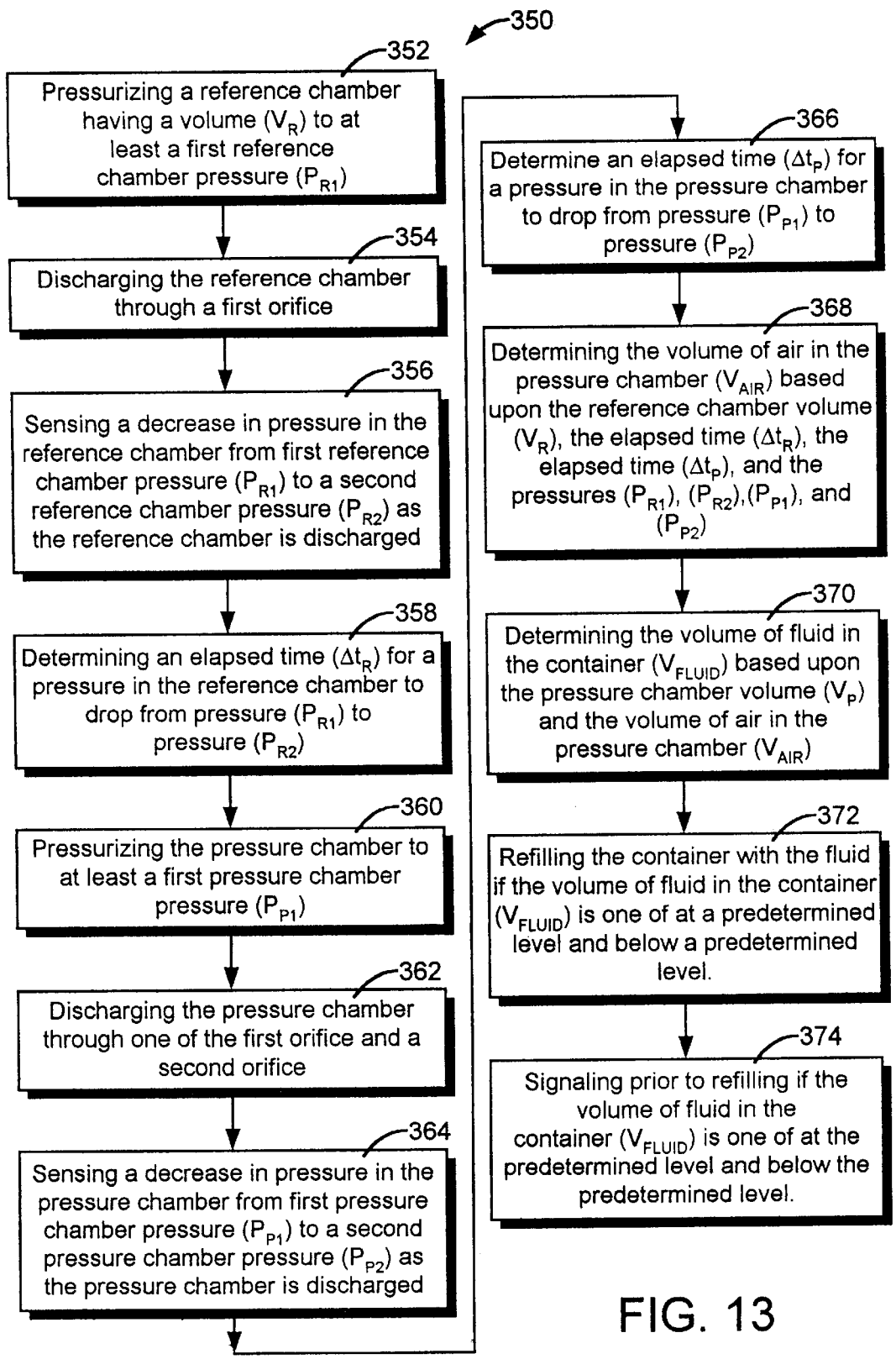
FIG. 13 is a flow diagram of a method for determining the volume of fluid in a container ($V_{FLUID}$) based upon the volume of air in a pressure chamber ($V_{AIR}$) having a volume ($V_P$) in accordance with the present invention.

FIG. 13 illustrates a flow diagram of a method 350 for determining the volume of fluid in a container ($V_{FLUID}$) based upon the volume of air in a pressure chamber ($V_{AIR}$) having a volume ($V_P$), in accordance with the present invention. The method includes the steps of pressurizing a reference chamber having a volume ($V_R$) to at least a first reference chamber pressure ($P_{R1}$) 352, discharging the reference chamber through a first orifice 354, sensing a decrease in pressure in the reference chamber from first reference chamber pressure ($P_{R1}$) to a second reference chamber pressure ($P_{R2}$) as the reference chamber is discharged 356, and determining an elapsed time ($\Delta t_P$) for a pressure in the reference chamber to drop from pressure ($P_{R1}$) to the pressure ($P_{R2}$) 358. The method includes the additional steps of pressurizing the pressure chamber to at least a first pressure chamber pressure ($P_{P1}$) 360, discharging the pressure chamber through either the first orifice or a second orifice 362, sensing a decrease in pressure in the pressure chamber from first pressure chamber pressure ($P_{P1}$) to a second pressure chamber pressure ($P_{P2}$) as the pressure chamber is discharged 364, and determining an elapsed time ($\Delta t_P$) for a pressure in the pressure chamber to drop from pressure ($P_{P1}$) to the pressure ($P_{P2}$) 366. The method further includes the steps of determining the volume of air in the pressure chamber ($V_{AIR}$) based upon the reference chamber volume ($V_R$), the elapsed time ($\Delta t_R$), the elapsed time ($\Delta t_P$), and the pressures ($P_{R1}$), ($P_{R2}$), ($P_{P1}$), and ($P_{P2}$) 368 and determining the volume of fluid in the container ($V_{FLUID}$) based upon the pressure chamber volume ($V_P$) and the volume of air in the pressure chamber ($V_{AIR}$) 370.

The above-described method may also include the step of refilling the container with the fluid if the volume of fluid in the container ($V_{FLUID}$) is at a predetermined level or below a predetermined level 372 and, for example, in need of refilling. The above-described method may further includes the step of signaling prior to refilling if the volume of fluid in the container ($V_{FLUID}$) is at the predetermined level or below the predetermined level 374.

Although the invention has been described and illustrated in detail, it is to be clearly understood that the same is intended by way of illustration and example only, and is not to be taken by way of limitation. The spirit and scope of the invention are to be limited only by the terms of the following claims.

What is claimed is:

1. A fluid level detection system for determining a volume of a fluid in a container ($V_{FLUID}$), comprising:
   a container in which a fluid is disposed;
   a reference chamber, the reference chamber having a volume ($V_R$);
   a pressure chamber in which the container is disposed, the pressure chamber having a volume ($V_P$);
   an air source;
   an air management system including at least one orifice, the air management system being configured to selectively couple the air source to the reference chamber to pressurize the reference chamber to at least a first reference chamber pressure ($P_{R1}$), to selectively couple the air source to the pressure chamber to pressurize the pressure chamber to at least a first pressure chamber pressure ($P_{P1}$), to selectively couple the reference chamber to the orifice to discharge the reference chamber, and to selectively couple the pressure chamber to the orifice to discharge the pressure chamber;
   a pressure sensor configured to sense pressure;
   a time measurement device configured to determine an elapsed time ($\Delta t_R$) for a pressure in the reference chamber to drop from pressure ($P_{R1}$) to a lower pressure ($P_{R2}$), as sensed by the pressure sensor, and to determine an elapsed time ($\Delta t_P$) for a pressure in the pressure chamber to drop from pressure ($P_{P1}$) to a lower pressure ($P_{P2}$), as sensed by the pressure sensor; and
   a computing device configured to determine a volume of air in the pressure chamber ($V_{AIR}$) based upon the reference chamber volume ($V_R$), the elapsed time ($\Delta t_R$), the elapsed time ($\Delta t_P$), and the pressures ($P_{R1}$), ($P_{R2}$), ($P_{P1}$), and ($P_{P2}$), and further configured to determine the volume of fluid in the container ($V_{FLUID}$) based upon the pressure chamber volume ($V_P$) and the volume of air in the pressure chamber ($V_{AIR}$).

2. The fluid level detection system of claim 1, wherein the air management system includes a first orifice through which the reference chamber is discharged and a second orifice through which the pressure chamber is discharged.

3. The fluid level detection system of claim 1, wherein the time measurement device and the computing device include one of a microprocessor and a controller that actuates the air management system to control selective coupling of the reference chamber to the air source, the pressure chamber to the air source, the reference chamber to the orifice, and the pressure chamber to the orifice, and that is coupled to the pressure sensor to receive data representative of the sensed pressure points.

4. The fluid level detection system of claim 1, wherein the air source includes a pump and the air management system includes conduit between the pump and the reference chamber, conduit between the pump and the pressure chamber, at least one valve, actuable to control pressurization of the reference and pressure chambers, conduit between the orifice and the reference and pressure chambers, and a valve, actuable to control depressurization of the reference and pressure chambers via the orifice.

5. The fluid level detection system of claim 1, wherein the container includes a bag.

6. The fluid level detection system of claim 5, wherein the pressure chamber includes an air-tight bag surrounding the container.

7. The fluid level detection system of claim 1, wherein the pressure sensor includes a first pressure sensor that senses pressures $P_{R1}$ and $P_{P1}$ and a second pressure sensor that senses $P_{R2}$ and $P_{P2}$.

8. A method for determining a volume of a fluid in a container ($V_{FLUID}$) based upon a volume of air in a pressure chamber ($V_{AIR}$) having a volume ($V_P$), the method comprising the steps of:
   pressurizing a reference chamber having a volume ($V_R$) to at least a first reference chamber pressure ($P_{R1}$);
   discharging the reference chamber through a first orifice;
   sensing a decrease in pressure in the reference chamber from first reference chamber pressure ($P_{R1}$) to a second reference chamber pressure ($P_{R2}$) as the reference chamber is discharged;
   determining an elapsed time ($\Delta t_R$) for a pressure in the reference chamber to drop from pressure ($P_{R1}$) to the pressure ($P_{R2}$);
   pressurizing the pressure chamber to at least a first pressure chamber pressure ($P_{P1}$);
   discharging the pressure chamber through one of the first orifice and a second orifice;
   sensing a decrease in pressure in the pressure chamber from first pressure chamber pressure ($P_{P1}$) to a second pressure chamber pressure ($P_{P2}$) as the pressure chamber is discharged;
   determining an elapsed time ($\Delta t_P$) for a pressure in the pressure chamber to drop from pressure ($P_{P1}$) to the pressure ($P_{P2}$);
   determining the volume of air in the pressure chamber ($V_{AIR}$) based upon the reference chamber volume ($V_R$), the elapsed time ($\Delta t_R$), the elapsed time ($\Delta t_P$), and the pressures ($P_{R1}$), ($P_{R2}$), ($P_{P1}$), and ($P_{P2}$); and
   determining the volume of fluid in the container ($V_{FLUID}$) based upon the pressure chamber volume ($V_P$) and the volume of air in the pressure chamber ($V_{AIR}$).

9. The method of claim 8, further comprising the step of refilling the container with the fluid if the volume of fluid in the container ($V_{FLUID}$) is one of at a predetermined level and below a predetermined level.

10. The method of claim 9, further comprising the step of signaling prior to refilling if the volume of fluid in the container ($V_{FLUID}$) is one of at the predetermined level and below the predetermined level.

11. A printing device, comprising:
   a printing mechanism that prints an image;
   a printing composition;
   a container in which the printing composition is stored, the container being coupled to the printing mechanism to deliver the printing composition to the printing mechanism to print the image;
   a control system that enables printing by the printing mechanism;
   a pressure chamber in which the container is disposed, the pressure chamber having a volume ($V_P$); and
   a fluid level detection system for determining a volume of a fluid in the container ($V_{FLUID}$), the fluid level detection system being configured to determine the volume of the fluid in the container ($V_{FLUID}$) based upon the volume of air in the pressure chamber ($V_{AIR}$);

wherein the fluid level detection system includes a reference chamber, the reference chamber having a volume ($V_R$), an air source, an air management system including at least one orifice, the air management system being configured to selectively couple the air source to the reference chamber to pressurize the reference chamber to at least a first reference chamber pressure ($P_{R1}$), to selectively couple the air source to the pressure chamber to pressurize the pressure chamber to at least a first pressure chamber pressure ($P_{P1}$), to selectively couple the reference chamber to the orifice to discharge the reference chamber, and to selectively couple the pressure chamber to the orifice to discharge the pressure chamber, a pressure sensor configured to sense pressure, a time measurement device configured to determine an elapsed time ($\Delta t_R$) for a pressure in the reference chamber to drop from pressure ($P_{R1}$) to a lower pressure ($P_{R2}$), as sensed by the pressure sensor, and to determine an elapsed time ($\Delta t_P$) for a pressure in the pressure chamber to drop from pressure ($P_{P1}$) to a lower pressure ($P_{P2}$), as sensed by the pressure sensor, and a computing device configured to determine a volume of air in the pressure chamber ($V_{AIR}$) based upon the reference chamber volume ($V_R$), the elapsed time ($\Delta t_R$), the elapsed time ($\Delta t_P$), and the pressures ($P_{R1}$), ($P_{R2}$), ($P_{P1}$), and ($P_{P2}$), and further configured to determine the volume of fluid in the container ($V_{FLUID}$) based upon the pressure chamber volume ($V_P$) and the volume of air in the pressure chamber ($V_{AIR}$).

12. The printing device of claim 11, wherein the air source pressurizes the pressure chamber to pressurize the ink during printing of the printing device.

13. The printing device of claim 11, wherein the air management system includes a first orifice through which the reference chamber is discharged and a second orifice through which the pressure chamber is discharged.

14. The printing device of claim 11, wherein the time measurement device and the computing device include one of a microprocessor and a controller that actuates the air management system to control selective coupling of the reference chamber to the air source, the pressure chamber to the air source, the reference chamber to the orifice, and the pressure chamber to the orifice, and that is coupled to the pressure sensor to receive data representative of the sensed pressure points.

15. The printing device of claim 11, wherein the air source includes a pump and the air management system includes conduit between the pump and the reference chamber, conduit between the pump and the pressure chamber, at least one valve, actuable to control pressurization of the reference and pressure chambers, conduit between the orifice and the reference and pressure chambers, and a valve, actuable to control depressurization of the reference and pressure chambers via the orifice.

16. The fluid level detection system of claim 11, wherein the pressure sensor includes a first pressure sensor that senses pressures $P_{R1}$ and $P_{P1}$ and a second pressure sensor that senses $P_{R2}$ and $P_{P2}$.

17. A printing device, comprising:
a printing mechanism that prints an image;
a printing composition;
a container in which the printing composition is stored, the container being coupled to the printing mechanism to deliver the printing composition to the printing mechanism to print the image;
a control system that enables printing by the printing mechanism;
a pressure chamber in which the container is disposed, the pressure chamber having a volume ($V_P$) and including an air-tight bag surrounding the container; and
a fluid level detection system for determining a volume of a fluid in the container ($V_{FLUID}$), the fluid level detection system being configured to determine the volume of the fluid in the container ($V_{FLUID}$) based upon the volume of air in the pressure chamber ($V_{AIR}$).

18. A printing device, comprising:
a printing mechanism that prints an image;
a printing composition;
a container in which the printing composition is stored, the container being coupled to the printing mechanism to deliver the printing composition to the printing mechanism to print the image;
a control system that enables printing by the printing mechanism;
a pressure chamber in which the container is disposed, the pressure chamber having a volume ($V_P$); and
means for determining a volume of a fluid in the container ($V_{FLUID}$) by depressurizing a volume of air in the pressure chamber ($V_{AIR}$);
wherein the means for determining includes a reference chamber, the reference chamber having a volume ($V_R$), an air source, an air management system including at least one orifice, the air management system being configured to selectively couple the air source to the reference chamber to pressurize the reference chamber to at least a first reference chamber pressure ($P_{R1}$), to selectively couple the air source to the pressure chamber to pressurize the pressure chamber to at least a first pressure chamber pressure ($P_{P1}$), to selectively couple the reference chamber to the orifice to discharge the reference chamber, and to selectively couple the pressure chamber to the orifice to discharge the pressure chamber, a pressure sensor configured to sense pressure, a time measurement device configured to determine an elapsed time ($\Delta t_R$) for a pressure in the reference chamber to drop from pressure ($P_{R1}$) to a lower pressure ($P_{R2}$), as sensed by the pressure sensor, and to determine an elapsed time ($\Delta t_P$) for a pressure in the pressure chamber to drop from pressure ($P_{P1}$) to a lower pressure ($P_{P2}$), as sensed by the pressure sensor, and a computing device configured to determine a volume of air in the pressure chamber ($V_{AIR}$) based upon the reference chamber volume ($V_R$), the elapsed time ($\Delta t_R$), the elapsed time ($\Delta t_P$), and the pressures ($P_{R1}$), ($P_{R2}$), ($P_{P1}$), and ($P_{P2}$), and further configured to determine the volume of fluid in the container ($V_{FLUID}$) based upon the pressure chamber volume ($V_P$) and the volume of air in the pressure chamber ($V_{AIR}$).

19. The printing device of claim 18, wherein the air source pressurizes the pressure chamber to pressurize the ink during printing of the printing device.

20. The printing device of claim 18, wherein the air management system includes a first orifice through which the reference chamber is discharged and a second orifice through which the pressure chamber is discharged.

21. The printing device of claim 18, wherein the time measurement device and the computing device include one of a microprocessor and a controller that actuates the air management system to control selective coupling of the reference chamber to the air source, the pressure chamber to the air source, the reference chamber to the orifice, and the pressure chamber to the orifice, and that is coupled to the pressure sensor to receive data representative of the sensed pressure points.

22. The printing device of claim 18, wherein the air source includes a pump and the air management system includes conduit between the pump and the reference chamber, conduit between the pump and the pressure chamber, at least one valve, actuable to control pressurization of the reference and pressure chambers, conduit between the orifice and the reference and pressure chambers, and a valve, actuable to control depressurization of the reference and pressure chambers via the orifice.

23. The fluid level detection system of claim 18, wherein the pressure sensor includes a first pressure sensor that senses pressures $P_{R1}$ and $P_{P1}$ and a second pressure sensor that senses $P_{R2}$ and $P_{P2}$.

* * * * *